No. 827,543. PATENTED JULY 31, 1906.
T. & J. T. LEWIS.
WAGON RAISER.
APPLICATION FILED APR. 26, 1906.
2 SHEETS—SHEET 1.
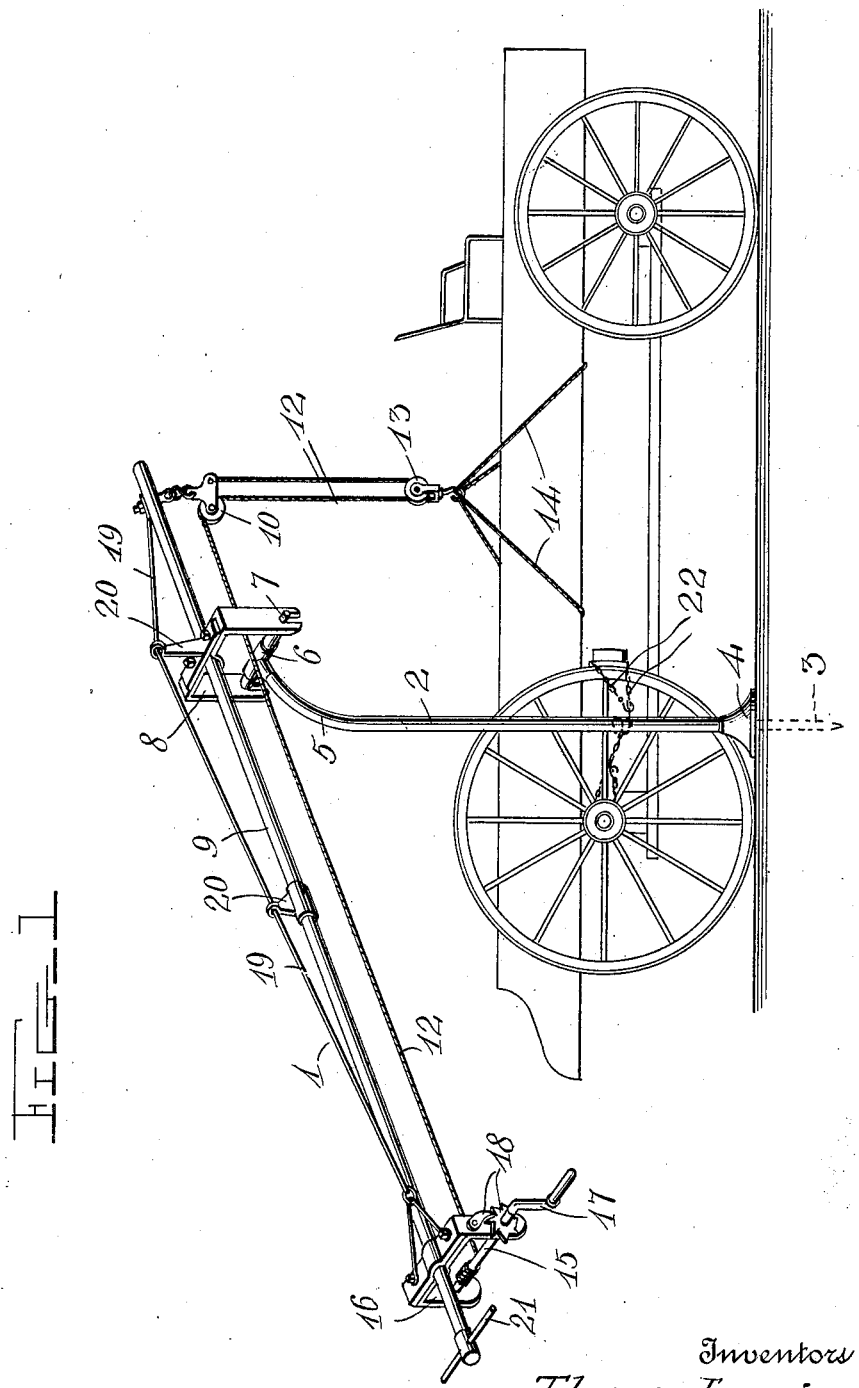
Witnesses
Inventors
Thomas Lewis
& Jesse T. Lewis
by H. B. Willson & Co
Attorneys No. 827,543. PATENTED JULY 31, 1906.
T. & J. T. LEWIS.
WAGON RAISER.
APPLICATION FILED APR. 26, 1906.
2 SHEETS—SHEET 2.
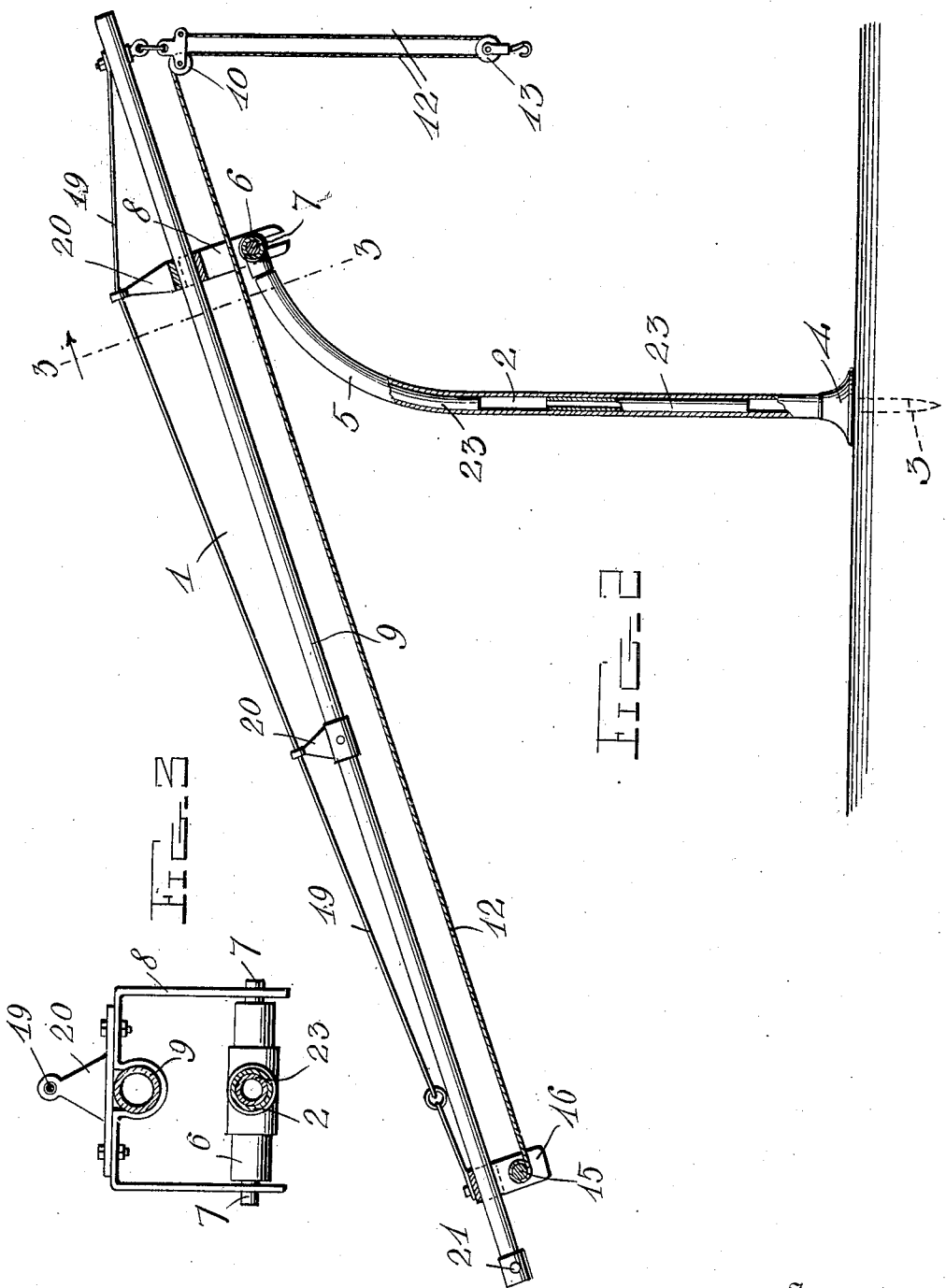
Witnesses
C. H. Griesbauer.
Inventors
Thomas Lewis
& Jesse T. Lewis
by H. B. Willson & Co.
Attorneys

UNITED STATES PATENT OFFICE.

THOMAS LEWIS AND JESSE T. LEWIS, OF SMITHFIELD, PENNSYLVANIA.

WAGON-RAISER.

No. 827,543.

Specification of Letters Patent.

Patented July 31, 1906.

Application filed April 26, 1906. Serial No. 313,879.

*To all whom it may concern:*

Be it known that we, THOMAS LEWIS and JESSE T. LEWIS, citizens of the United States, residing at Smithfield, in the county of Fayette and State of Pennsylvania, have invented certain new and useful Improvements in Wagon-Raisers; and we do declare the following to be a full, clear, and exact description of the invention, such as will enable others skilled in the art to which it appertains to make and use the same.

This invention relates to improvements in wagon-raisers.

The object of the invention is to provide a device of this character by means of which a wagon bed or body may be easily lifted and removed from the running-gear.

A further object is to provide a wagon-raiser so constructed as to permit the same to be readily carried in the wagon and set up at any desired place for removing the body of the wagon.

With the above and other objects in view the invention consists of certain novel features of construction, combination, and arrangement of parts, as will be hereinafter described and claimed.

In the accompanying drawings, Figure 1 is a perspective view showing the manner of using the device for raising a wagon-body. Fig. 2 is a side view of the device, partly in section; and Fig. 3 is a vertical sectional view on the line 3 3 of Fig. 2.

Referring more particularly to the drawings, 1 denotes the wagon-raiser, which consists of a standard or post 2 of suitable length. On the lower end of the standard 2 is formed a point 3, above which is arranged a flange or collar 4. By means of the point 3 the standard is forced into the ground, and thereby supported. The flange or collar 4 is adapted to engage the surface of the ground and prevent the post from being forced therein by the load or weight of the wagon-body thereon. The upper end of the post or standard 2 is preferably curved, as shown at 5, and on the extreme upper end is arranged a cross-head 6, in which is journaled a pivot bar or shaft 7. The post or standard 2 is preferably formed of gas-pipe or other tubular material, and the cross-head 6 on the upper end thereof may be in the form of a T.

Pivotally mounted on the shaft 7 is a yoke or supporting frame 8, to the upper side of which is secured a boom or lever 9, to the outer short end of which is secured a pulley-block or sheave 10, through which is adapted to pass a hoisting-cable 12. On the cable 12 is arranged a second pulley or sheave 13, to which is connected a sling 14, adapted to be engaged with the bottom of the wagon, as shown. The opposite end of the cable 12 is connected to a winding-shaft 15, which is journaled in a yoke or frame 16, secured to the lower end of the shaft or boom 9, as shown. The shaft 15 is provided with a crank-handle 17 and with a pawl-and-ratchet locking device 18, by means of which the shaft may be held against retrograde movement. Connected to the outer end of the boom 9 is a clutch-rod 19, which extends over braces 20 and is connected at its opposite end to the yoke 16 at the lower end of the boom. If desired, the lower end of the boom may be provided with a transversely-disposed handle-bar 21, by means of which said boom may be rocked on the shaft 7 in the upper end of the stem. When the device is set up for use, the standard 2 is adapted to be secured to the brake-beam or other suitable part of the wagon running-gear by means of a chain or other fastening device 22. The standard 2 is preferably reinforced at its curved upper end and at the point where the fastening-chain is engaged therewith by arranging in said standard a smaller tube or rod 23. The boom or lever 9 is preferably formed of gas-pipe or other tubular material. The tubular construction of the stem and boom provides strength and lightness for the device, thus enabling the same to be readily placed in the wagon and transported to any desired place for use, where the device may be readily set up and the wagon body or bed removed from the running-gear.

A wagon-raiser constructed as herein shown and described will be simple, strong, durable, and inexpensive in construction, efficient in operation, and well adapted to the purpose for which it is designed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described our invention, what we claim as new, and desire to secure by Letters Patent, is—

1. In a wagon-raiser, the combination with a supporting post or standard having arranged in its upper end a pivot-shaft, of a yoke or supporting-frame pivotally connected to said shaft, a boom connected to said yoke, a hoisting-cable and pulleys connected to said boom, a yoke connected to the outer end of said boom, a windlass-shaft journaled in said last-named yoke to wind and unwind said hoisting-cable, and means to prevent a retrograde movement of said winding-shaft, substantially as described.

2. In a wagon-raiser, the combination with a tubular supporting-standard having on its lower end a ground-engaging point and means to limit the passage of said post into the ground, of a boom pivotally mounted on the upper end of said standard, a truss-rod and braces secured to said beam, a hoisting-cable and pulleys connected to the outer end of the latter, a winding-shaft mounted on the inner end of said boom, a crank-handle connected to said shaft, whereby the same may be operated to wind and unwind said cable, and a sling adapted to be engaged with the wagon-body and connected to said cable, substantially as described.

3. In a wagon-raiser, the combination with a tubular supporting-standard having on its lower end a ground-engaging point and means to limit the passage of said post into the ground, of a boom pivotally mounted on the upper end of said standard, a truss-rod and braces secured to said beam, a hoisting-cable and pulleys connected to the outer end of the latter, a winding-shaft mounted on the inner end of said boom, a crank-handle connected to said shaft whereby the same may be operated to wind and unwind said cable, a sling adapted to be engaged with the wagon-body and connected to said cable, and means to secure said standard to the running-gear of the wagon, substantially as described.

In testimony whereof we have hereunto set our hands in presence of two subscribing witnesses.

THOMAS LEWIS.
JESSE T. LEWIS.

Witnesses:
JAMES A. MATTHEWS,
JACOB C. HIGH